US010618811B2

(12) United States Patent
Waller

(10) Patent No.: US 10,618,811 B2
(45) Date of Patent: *Apr. 14, 2020

(54) MIXED METAL OXIDE CATALYST AND PRODUCTION OF NITRIC OXIDE BY OXIDATION OF AMMONIA

(71) Applicant: YARA INTERNATIONAL ASA, Oslo (NO)

(72) Inventor: David Waller, Porsgrunn (NO)

(73) Assignee: YARA INTERNATIONAL ASA (NO)

( * ) Notice: Subject to any disclaimer, the term of this patent is extended or adjusted under 35 U.S.C. 154(b) by 138 days.

This patent is subject to a terminal disclaimer.

(21) Appl. No.: 15/638,714

(22) Filed: Jun. 30, 2017

(65) Prior Publication Data

US 2017/0334721 A1    Nov. 23, 2017

Related U.S. Application Data

(63) Continuation of application No. 12/733,304, filed as application No. PCT/NO2008/000297 on Aug. 22, 2008, now Pat. No. 9,725,319.

(30) Foreign Application Priority Data

Aug. 24, 2007   (NO) ................................ 20074325

(51) Int. Cl.
*B01J 23/86* (2006.01)
*C01B 21/26* (2006.01)
(Continued)

(52) U.S. Cl.
CPC ........... *C01B 21/265* (2013.01); *B01J 23/002* (2013.01); *B01J 23/75* (2013.01); *B01J 23/864* (2013.01);
(Continued)

(58) Field of Classification Search
CPC ........ B01J 23/002; B01J 23/005; B01J 23/16; B01J 23/24; B01J 23/32; B01J 23/54;
(Continued)

(56) References Cited

U.S. PATENT DOCUMENTS 3,985,681 A * 10/1976 Senes ...................... B01J 23/83
                                                                    502/303
4,389,339 A     6/1983 James

FOREIGN PATENT DOCUMENTS

| GB | 1342577 | 1/1974 |
| GB | 1364001 | 8/1974 |
| GB | 1436346 | 5/1976 |

OTHER PUBLICATIONS

Vidales et al (NPL: "Low Temperature preparation of Manganese Cobaltite Spinels", Mat. Res. Bull. vol. 28, pp. 1135-1143, 1993 (Year: 1993).*

(Continued)

*Primary Examiner* — Melvin C. Mayes
*Assistant Examiner* — Smita S Patel
(74) *Attorney, Agent, or Firm* — Dilworth IP, LLC

(57) ABSTRACT

The present invention provides a catalyst for production of nitric oxide from ammonia and oxygen. The catalyst has the composition $A_{3-x}B_xO_{9-y}$, wherein A and B are selected from the group Mn, Co, Cr, Fe and Al, x is between 0 and 3 and y is between 0 and 6. The catalyst has a high selectivity towards nitric oxide and a low ignition temperature in the reactor. Further the present invention relates to a method for the production of gas comprising nitric oxide by the catalyst of the present invention. The produced gas has a low content of nitrous oxide.

11 Claims, 2 Drawing Sheets

(51) Int. Cl.
  *B01J 23/00* (2006.01)
  *B01J 23/75* (2006.01)
  *B01J 23/889* (2006.01)
  *B01J 37/03* (2006.01)

(52) U.S. Cl.
  CPC .......... *B01J 23/8892* (2013.01); *B01J 37/03* (2013.01); *B01J 23/005* (2013.01)

(58) Field of Classification Search
  CPC ...... B01J 23/64; B01J 23/652; B01J 23/6522; B01J 23/656; B01J 23/6562; B01J 23/75; B01J 23/70; B01J 23/84; B01J 23/85; B01J 23/86; B01J 23/882; B01J 23/8878; C01B 21/24; C01B 21/20; C01B 21/203; C01B 21/26; C01B 21/265
  See application file for complete search history.

(56) References Cited

OTHER PUBLICATIONS

Chematur Engineering Group, "Business Area Nitric Acid UAN Solution", pp. 1-4.
Thyssen Krupp Uhde, "Nitrate Fertilisers", pp. 1-20.
Krzysztof Schmidt-Szalowski, Krzysztof Krawczyk, Jan Petryk, The Properties of cobalt oxide catalyst for ammonia oxidation; Applied Catalysis A: general 175 (1988) 147-157.

\* cited by examiner

MIXED METAL OXIDE CATALYST AND PRODUCTION OF NITRIC OXIDE BY OXIDATION OF AMMONIA

RELATED APPLICATIONS

This application is a continuation of U.S. application Ser. No. 12/733,304 filed on May 12, 2010, which is a U.S. national stage of International Application No. PCT/NO2008/000297 filed on Aug. 22, 2008, and claiming priority to Norway Application No. 20074325 filed on Aug. 24, 2007.

The present invention relates to a catalyst for production of nitric oxide, its use and a method for the production of nitric oxide.

BACKGROUND

The process for the production of nitric oxide is known as the Ostwald process and has essentially remained unchanged, since its inception in the first decades of the twentieth century. Ostwald's patent was dated 1902 and when combined with Haber's development of synthesising ammonia directly from nitrogen, in 1908, the basis for the commercial production of nitric acid, which is used today, was in place.

The basis of the current Ostwald's process is combustion of ammonia over a platinum based metal or alloy catalyst in the form of a gauze or mesh or net. The gauzes are either woven or knitted.

Over the last sixty years, many attempts have been made to replace the expensive platinum-based combustion catalyst with a lower cost catalyst. To date, the only commercially available oxide-based catalyst for ammonia combustion is produced by Incitec Pivot Ltd (Australia). This is based on a cobalt oxide phase. However, in terms of its selectivity of combustion of ammonia to the desired nitric oxide product, its performance is inferior to that of platinum-based systems. The cobalt oxide based systems have shown selectivity levels of about 90% in commercial units, compared to the 94 to 98% achieved with platinum-base catalysts.

OBJECTIVE

One objective of the present invention is to provide a catalyst with high selectivity for production of nitric oxide through oxidation of ammonia.

Another objective is to provide an active catalyst for production of nitric oxide.

Another objective is to provide an improved catalyst which overcomes some of the disadvantages mentioned above.

The objectives of the invention may be obtained by the features as set forth in the following description of the invention and/or in the appended patent claims.

DESCRIPTION OF THE INVENTION

The present invention provides a catalyst for ammonia oxidation based on low-cost oxide systems. The general formula for the catalysts is $A_{3-x}B_xO_{9-y}$, wherein combinations of A and B are selected from the groups A=Mn and B=Co, Al or Cr, A=Cr and B=Mn, Co or Al, A=Co and B=Mn, Cr or Fe, A=Fe and B=Co or Al, and A=Al and B=Mn, Cr or Fe, x is between 0 and 3 and y is between 0 and 6. Preferably y is between 4 and 6, and more preferred y is 5. The catalyst formulations are shown in Table 1. The value of y is depending on the combination of metals and the values of x.

TABLE 1

| Base system | Upper limit of x | Lower limit of x | Upper limit of y | Lower limit of y |
|---|---|---|---|---|
| $Mn_{3-x}Co_xO_{9-y}$ | 3 | 0 | 6 | 0 |
| $Mn_{3-x}Al_xO_{9-y}$ | 3 | 0 | 6 | 0 |
| $Mn_{3-x}Cr_xO_{9-y}$ | 3 | 0 | 6 | 0 |
| $Cr_{3-x}Al_xO_{9-y}$ | 3 | 0 | 6 | 0 |
| $Cr_{3-x}Co_xO_{9-y}$ | 3 | 0 | 6 | 0 |
| $Fe_{3-x}Co_xO_{9-y}$ | 3 | 0 | 6 | 0 |
| $Fe_{3-x}Al_xO_{9-y}$ | 3 | 0 | 6 | 0 |

Without limiting the scope of the present invention, there can be mentioned as preferred catalysts the formulations of $Mn_{3-x}Co_xO_{9-y}$, or $Cr_{3-x}Co_xO_{9-y}$. More specifically and accordingly there can be mentioned the preferred catalysts $Mn_{2.5}Co_{0.5}O_4$, $Mn_{1.5}Co_{1.5}O_4$, $MnCo_2O_4$, or $Cr_{0.5}Co_{2.5}O_4$.

The catalyst may be prepared by co-precipitation, complexation, combustion synthesis, freeze-drying or solid-state routes, or by other state-of-the-art methods of producing mixed-metal oxides.

Further the present invention provides a method for the production of a gas comprising nitric oxide, wherein a gas blend, which comprises ammonia and oxygen, is converted in presence of a catalyst according to the present invention.

The method of the present invention comprises the following steps (a) continuously feeding the gas blend comprising ammonia and oxygen to a reactor which comprises the catalyst of the present invention, whereby the temperature of the feed $T_{a1}$ is increased until ignition of the reaction at temperature $T_b$, (b) thereafter adjusting the temperature of the feed $T_{a2}$ to achieve a defined temperature in the reactor $T_c$. The reactor may be an atmospheric pressure reactor with a catalyst bed. The temperature of the feed $T_{a1}$ may be increased with a rate of 2 to 10° C./min or 3 to 6° C./min or 5° C./min for example by increasing the temperature of the feedstock pre-heater.

Under heating, the fed gases will ignite at the ignition temperature $T_b$. Ignition results in a temperature increase in the reactor. $T_b$ is defined as an increase in temperature in the catalyst bed (measured with a thermocouple placed in the catalyst bed) at a rate exceeding 20° C./second. The ignition temperature indicates that the catalyst is active towards ammonia oxidation and is therefore sought to be as low as possible. Further, a high ignition temperature could hinder the catalyst from being used in commercial reactors most commonly used today. The ignition temperature $T_b$ of the method of the present invention is in the range of 240° C. to 465° C. or 240° C. to 380° C. or 240° C. to 300° C. or 240° C. to 270° C.

After ignition in step (b) the temperature of the feed $T_{a2}$ is adjusted to achieve a defined temperature in the reactor $T_c$. Often, the adjustment is a decrease of the feed temperature, if the ignition temperature $T_b$ is high, which may prevent a overheating in the reactor due to ignition. The adjustment may be done by reducing the temperature of the feedstock pre-heater. $T_c$ may be in the range of 800-950° C. or 800-900° C. or 800-850° C. The temperature $T_c$ may be a series of defined temperatures. For example $T_c$ may be composed of $T_{c1}$, $T_{c2}$ and $T_{c3}$, whereby for example of $T_{c1}$=800° C., $T_{c2}$=850° C. and $T_{c3}$=900° C. $T_c$ may have values higher or lower than the aforementioned temperatures, depending on the design of the reactor.

The selectivity of a catalyst can be determined by using the $N_2O$ concentration from infrared measurements and nitrogen concentrations from mass spectroscopic measurements. By measuring the concentrations of these two undesired by-products, the concentration of the desired nitric oxide and additional nitrogen dioxide may be calculated. In the method of the present invention the selectivity of the conversion towards nitrous oxide and nitrogen dioxide was measured accordingly and found to be 90% to 96% or 92% to 96% or 94% to 96% or 95% to 96%.

The gases produced by the method of the present invention have a low concentration of nitrous oxide, compared to conventional platinum-based combustion catalysts. The concentration may be lower than 500 ppm or lower than 400 ppm or lower than 300 ppm.

The present invention relates further to the use of a catalyst according to the present invention for conversion of a gas blend which comprises ammonia and oxygen to nitric oxide.

The catalysts of the present invention are shown to have a very high selectivity, up to 96%. Further the catalyst has a high activity towards production of nitric oxide. Since the catalyst of the present invention consists of low cost oxides, it may replace the expensive platinum based catalyst systems in use today.

Further, the invention provides oxide catalysts from several elements and thereby gives many possibilities to produce different compositions. Thereby the present invention provides a concept to design catalysts for production of nitric oxide where the elements can be chosen e.g. according to considerations of costs and availability of elements. Since the different compositions will result in variations of their functional properties, their choice may be optimized to fit to the selected plant.

Further, the catalyst of the present invention can be used in methods of the art, as in fluidized bed reactors and is easily installed in existing processing equipment.

The method of the present invention results in a cleaner nitric oxide since the level of undesired nitrous oxide is low. The high selectivity increases the efficiency of the method and reduces the need for further purification. Thereby the nitric oxide may find new application areas where pure nitric oxide at low cost is demanded.

Figure 1:
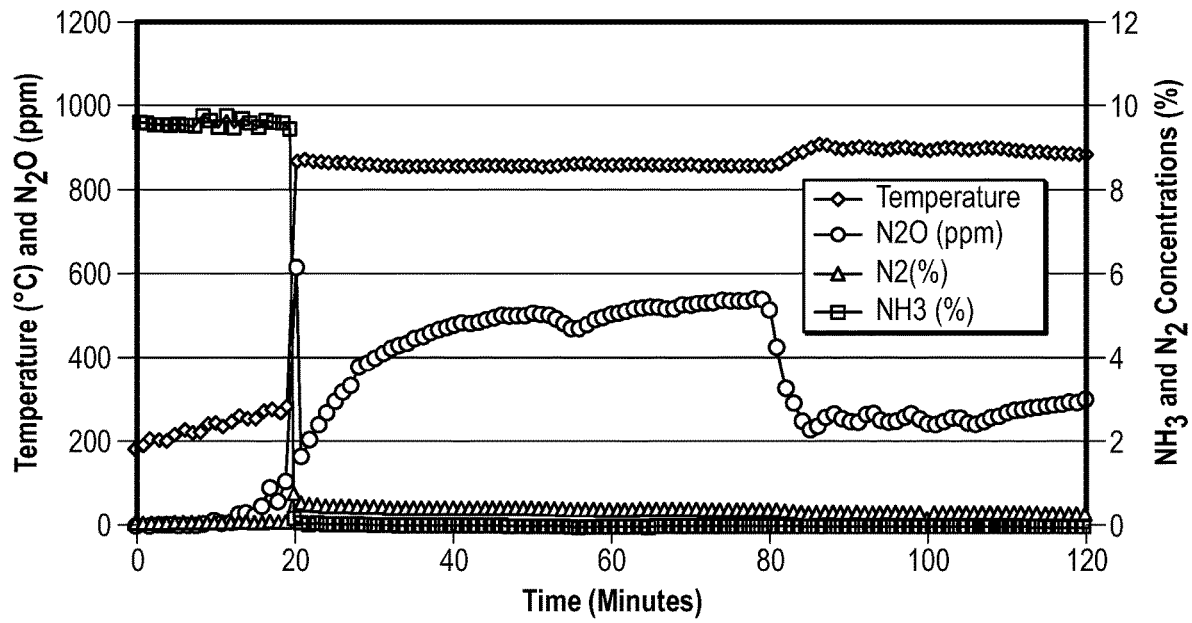
FIG. 1 shows the experimental properties of $Co_{1.5}Cr_{1.5}O_4$ which is one embodiment of the catalyst of the present invention.

The following non-limiting examples illustrate certain embodiments of the invention.

EXAMPLES

Example 1

The catalysts were tested in an atmospheric pressure reactor, with an internal diameter of 8 mm. The catalyst bed (0.15 cm³), consisting of catalyst granules in the size range of 0.2 to 0.5 mm, was supported on a quartz frit. The gas feedstock, consisting of 10 volume % ammonia in air or 20% oxygen/80% argon was passed through the catalyst bed, at a rate of 3 N l/min, and the product gas was analysed using infrared spectroscopy and mass spectrometry.

The experimental procedure involved increasing the temperature of the gas feedstock at a rate of 5° C./min until the catalyst initiated combustion, defined as an increase in temperature in the catalyst bed (measured with a thermocouple placed in the catalyst bed) at a rate exceeding 20° C./min second. After ignition, the temperature of the gas feedstock was adjusted, sequentially, to give catalyst bed temperatures of 800, 850 and 900° C. The nominal duration of each of these temperatures was 30 minutes.

The ignition temperatures towards formation of NO and $NO_2$, of the catalysts described in Table 1, are shown in Table 2.

TABLE 2

Ignition temperatures of mixed oxide catalysts in air + 10% $NH_3$

| Base System | Values of x | | | | | |
|---|---|---|---|---|---|---|
| | 0 | 0.5 | 1.0 | 1.5 | 2.0 | 2.5 |
| $Mn_{3-x}Co_xO_{9-y}$ | | 322 | 305 | 309 | 272 | 317 |
| $Mn_{3-x}Al_xO_{9-y}$ | | 331 | 305 | 314 | 291 | 202 |
| $Mn_{3-x}Cr_xO_{9-y}$ | | 336 | 310 | 292 | 276 | 278 |
| $Cr_{3-x}Al_xO_{9-y}$ | 281 | 269 | 276 | | | |
| $Cr_{3-x}Co_xO_{9-y}$ | 281 | 263 | 303 | 294 | 317 | 374 |
| $Fe_{3-x}Co_xO_{9-y}$ | | 453 | | 461 | >480 | |
| $Fe_{3-x}Al_xO_{9-y}$ | | | | | | |

The selectivity towards formation of NO and $NO_2$ of the catalysts described in Table 1, are shown in Table 3.

TABLE 3

Selectivity of mixed-oxide catalysts towards
NO + $NO_2$ in 10% $NH_3$ + 18% $O_2$ + 72% Argon

| Base System | Values of x | | | | | |
|---|---|---|---|---|---|---|
| | 0 | 0.5 | 1.0 | 1.5 | 2.0 | 2.5 |
| $Mn_{3-x}Co_xO_{9-y}$ | | 94 | 95 | 96 | 95 | 93 |
| $Mn_{3-x}Al_xO_{9-y}$ | | | | | 82 | |
| $Mn_{3-x}Cr_xO_{9-y}$ | | 93 | 89 | 84 | 83 | 90 |
| $Cr_{3-x}Al_xO_{9-y}$ | 90 | 92 | 84 | 70 | 75 | 74 |
| $Cr_{3-x}Co_xO_{9-y}$ | 90 | 92 | 80 | 93 | | 94 |
| $Fe_{3-x}Co_xO_{9-y}$ | | | | | | |
| $Fe_{3-x}Al_xO_{9-y}$ | | | | | | |

Example 2

An oxide with a composition $Cr_{1.5}Co_{1.5}O_4$ was prepared by co-precipitation. A mixed metal nitrate solution containing 1 mole/litre $Co(NO_3)_2.6H_2O$ and 1 mole/litre of $Cr(NO_3)_3.9H_2O$ was pumped together with a solution of ammonium carbonate (1 molar) heated to 60° C. After the precipitation reactor, the slurry passed into a holding tank, again heated to 60° C. The pH of the slurry was measured in the line between the precipitation reactor and the holding tank. The flow rates of the nitrate and the base were adjusted. When the precipitation was completed, the slurry in the holding tank was stirred overnight.

The resulting aged slurry was filtered with a vacuum filter and the filter cake dried at 90° C. overnight. The dried filter-cake was ground and heated in an air muffle oven at 400° C. for 12 hours. The calcined oxide was then reground and heated to 900° C. in air for 12 hours. XRD analysis confirmed that this material was a single phase, cubic mixed-oxide with the composition $Cr_{1.5}Co_{1.5}O_4$ (x=1.5 and y=5). The calcined catalyst was pressed into pellets, which were crushed to produce a sieve fraction between 0.2 and 0.5 mm. These granules (0.2776 g) were loaded into the ammonia oxidation reactor, and were subjected to a test procedure described above. The temperatures in the catalyst bed, concentrations of $N_2O$ and the selectivity towards $NO+NO_2$ are shown in FIG. 1.

From FIG. 1, we observe that ignition of the ammonia occurs after 20 minutes, at a temperature of 294° C. The reduction of the ammonia concentration is accompanied by a rapid increase in the catalyst temperature (to circa 870° C.). Prior to ignition it is observed that the $N_2O$ level increases, at temperatures above 230° C., prior to the ignition, and spikes during the ignition process, before decreasing again. At time=80 minutes the temperature of the inlet gas is adjusted, so the catalyst bed temperature rises to 900° C. During the isothermal period, between 20 and 80 minutes, the $N_2O$ level increases slowly. As the catalyst temperature is raised to 900° C., the $N_2O$ level decreases rapidly. The nitrogen concentration also spikes during ignition and then falls to a constant level.

Figure 2:
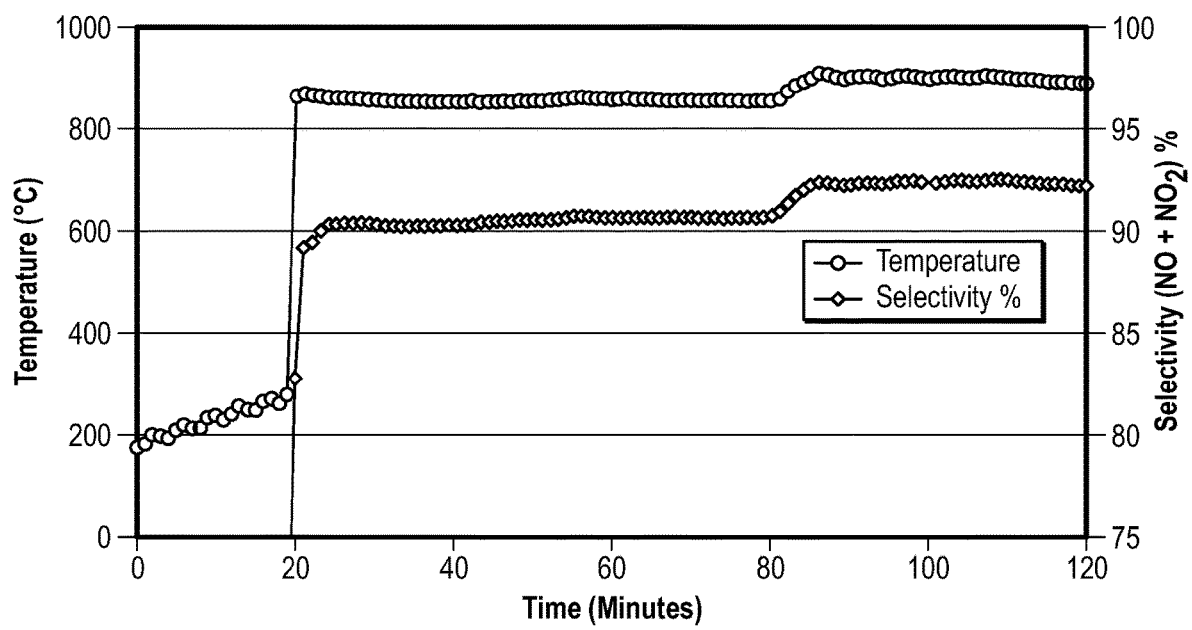
FIG. 2 shows the selectivity calculated from FIG. 1.

FIG. 2 shows the temperature and selectivity towards ($NO+NO_2$) for the $Cr_{1.5}Co_{1.5}O_4$ catalyst. After ignition at time=20 minutes, when the catalyst temperature is circa 870° C., the selectivity rises to 90 to 91%. When the temperature in the reactor is adjusted to 900° C., the selectivity over the $Cr_{1.5}Co_{1.5}O_4$ catalyst increases to 92.5%.

Example 3

An oxide with the composition $Mn_{1.5}Co_{1.5}O_4$ was prepared by complexation. 1 molar $Mn(NO_3)_2 \cdot 6H_2O$ and $Co(NO_3)_2 \cdot 6H_2O$ were mixed in a 1:1 ratio. To 100 ml of the metal nitrate solution was added 25 ml of 64% $HNO_3$, 100 ml of ethylene glycol and 211 g of citric acid. Stirring at 120° C. resulted in the formation of a viscous liquid/gel. The gel was heated at 400° C., in an air muffle oven, for 12 hours. The resulting powder was ground and reheated in the air muffle oven at 900° C. for 12 hours.

X-ray diffraction confirmed that this material was a single phase, cubic mixed-oxide with the composition $Mn_{1.5}Co_{1.5}O_4$ (x=1.5 and y=5).

The calcined catalyst was pressed into pellets, which were crushed to produce a sieve fraction between 0.2 and 0.5 mm. These granules (0.2813 g) were loaded into the ammonia oxidation reactor, and were subjected to a test procedure described above. The temperatures in the catalyst bed, concentrations of $N_2O$ and the selectivity towards $NO+NO_2$ are shown in FIG. 3.

Figure 3:
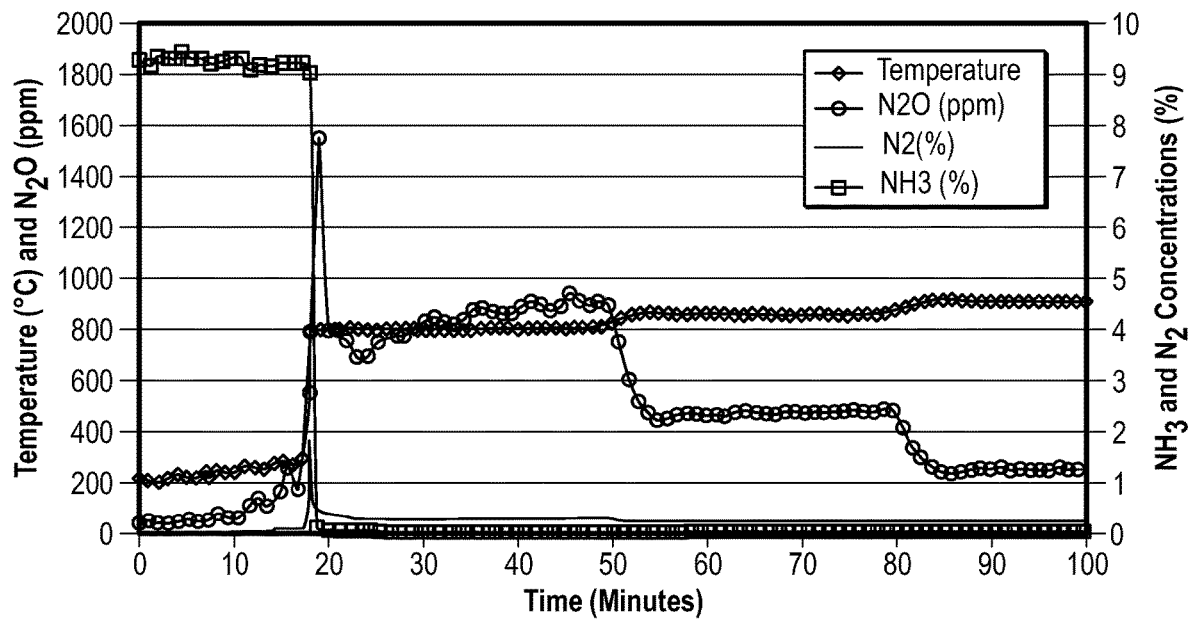
FIG. 3 shows the experimental properties of $Mn_{1.5}Co_{1.5}O_4$ which is one embodiment of the catalyst of the present invention.

From FIG. 3, we observe that ignition of the ammonia occurs after 18 minutes, at a temperature of 309° C. The reduction of the ammonia concentration is accompanied by a rapid increase in the catalyst temperature (to circa 800° C.). Prior to ignition it is observed that the $N_2O$ level increases, at temperatures above 230° C., prior to the ignition, and spikes during the ignition process, before decreasing again. At time=50 minutes the temperature of the inlet gas is adjusted, so the catalyst bed temperature rises to 850° C. During the isothermal period, between 20 and 50 minutes, the $N_2O$ level increases slowly. As the catalyst temperature is raised to 850° C., the $N_2O$ level decreases rapidly. At time=80 minutes, the temperature of the catalyst bed is increased to 900° C. Again, when the temperature of the catalyst bed is raised, the $N_2O$ level decreases. The nitrogen concentration also spikes during ignition and then falls to a constant level. There is a slight decrease in nitrogen concentration, when the catalyst temperature is raised from 800 to 850° C.

Figure 4:
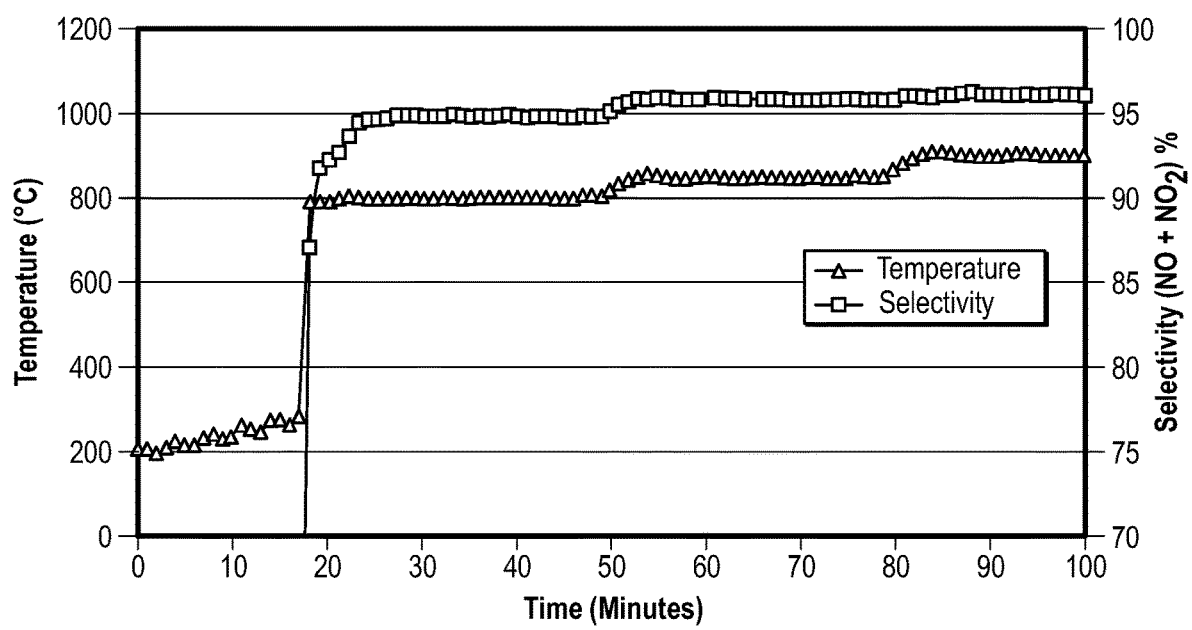
FIG. 4 shows the selectivity calculated from FIG. 3.

FIG. 4 shows the temperature and selectivity towards ($NO+NO_2$) for the $Mn_{1.5}Co_{1.5}O_4$ catalyst. It is observed, that after ignition, when the temperature of the $Mn_{1.5}Co_{1.5}O_4$ catalyst is 800° C., selectivity reaches 95%. As the temperature in the reactor is increased to 850 and 900° C., the selectivity increases to circa 96%.

I claim:

1. A method for the production of a gas comprising nitric oxide, the method comprising:
    converting a gas blend comprising ammonia and oxygen in a reactor at a reactor temperature $T_c$ of 850° to 950° C. in the presence of a catalyst comprising the composition $A_{3-x}B_xO_4$, wherein a combination of A and B are selected from:
    A=Mn or Cr and B=Co, and
    0<x<2, and wherein the selectivity of the conversion towards nitrous oxide and nitrogen dioxide is 94% to 96%.

2. The method according to claim 1, further comprising the steps of:
    (a) continuously feeding said gas blend to the reactor comprising said catalyst, whereby a temperature of the feed $T_{a1}$ is increased until ignition of a reaction at ignition temperature $T_b$, and
    (b) thereafter adjusting a temperature of the feed $T_{a2}$ to achieve the reactor temperature $T_c$.

3. The method according to claim 2, wherein the ignition temperature $T_b$ of said gas blend is 240° C. to 465° C.

4. The method according to claim 3, wherein the ignition temperature $T_b$ of said gas blend is 240° C. to 380° C.

5. The method according to claim 4, wherein the ignition temperature $T_b$ of said gas blend is 240° C. to 300° C.

6. The method according to claim 5, wherein the ignition temperature $T_b$ of said gas blend is 240° C. to 270° C.

7. The method according to claim 1, wherein the produced gas has a concentration of nitrous oxide lower than 500 ppm.

8. The method according to claim 7, wherein the produced gas has a concentration of nitrous oxide lower than 400 ppm.

9. The method according to claim 8, wherein the produced gas has a concentration of nitrous oxide lower than 300 ppm.

10. The method according to claim 1, wherein the selectivity of the conversion towards nitrous oxide and nitrogen dioxide is 95% to 96%.

11. A method for the production of a gas comprising nitric oxide, the method comprising:
    converting a gas blend comprising ammonia and oxygen in a reactor at a reactor temperature $T_c$ of 800° to 950° C. in the presence of a catalyst comprising the composition $A_{3-x}B_xO_4$, wherein a combination of A and B are selected from:
    A=Mn or Cr and B=Co, and
    0<x<2.

* * * * *